US011430226B2

(12) United States Patent
Lin (10) Patent No.: US 11,430,226 B2
(45) Date of Patent: Aug. 30, 2022

(54) LANE LINE RECOGNITION METHOD, LANE LINE RECOGNITION DEVICE AND NON-VOLATILE STORAGE MEDIUM

(71) Applicant: BOE TECHNOLOGY GROUP CO., LTD., Beijing (CN)

(72) Inventor: Hangdong Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 16/640,547

(22) PCT Filed: Jan. 14, 2019

(86) PCT No.: PCT/CN2019/071651
§ 371 (c)(1),
(2) Date: Feb. 20, 2020

(87) PCT Pub. No.: WO2020/146980
PCT Pub. Date: Jul. 23, 2020

(65) Prior Publication Data
US 2021/0142076 A1    May 13, 2021

(51) Int. Cl.
*G06V 20/56* (2022.01)
*G06T 7/11* (2017.01)
(Continued)

(52) U.S. Cl.
CPC .............. *G06V 20/588* (2022.01); *B60Q 9/00* (2013.01); *G06T 7/11* (2017.01); *G06T 7/246* (2017.01);
(Continued)

(58) Field of Classification Search
CPC ............ G06K 9/00798; G06K 9/0063; G06K 9/4609; G06K 9/00; G06T 2207/20084; G06T 2207/30252; G06T 7/11; G06T 7/246; G06T 2207/20021; G06T 2207/30256; G06V 20/588; G06V 10/443; G06V 10/454; G06V 30/18057; B60Q 9/00
See application file for complete search history.

(56) References Cited

U.S. PATENT DOCUMENTS

2012/0072080 A1 * 3/2012 Jeromin ................. G08G 1/167
701/49
2013/0120125 A1    5/2013 Wu
(Continued)

FOREIGN PATENT DOCUMENTS

| CN | 101916516 | 12/2010 |
|----|-----------|---------|
| CN | 103117005 | 5/2013  |

(Continued)

*Primary Examiner* — Kenny A Cese
(74) *Attorney, Agent, or Firm* — Leason Ellis LLP (57) ABSTRACT

A lane line recognition method, a lane line recognition device and a non-volatile storage medium. The method includes obtaining a first image which is a road image; dividing the first image from a middle of the first image to determine a first sub-image at a left part of the first image and a second sub-image at a right part of the first image; and performing respectively a recognition operation on the first sub-image and the second sub-image to determine a first lane line in the first sub-image and a second lane line in the second sub-image.

11 Claims, 5 Drawing Sheets

(51) Int. Cl.
*G06T 7/246* (2017.01)
*G06V 10/44* (2022.01)
*B60Q 9/00* (2006.01)

(52) U.S. Cl.
CPC .. *G06V 10/443* (2022.01); *G06T 2207/20021* (2013.01); *G06T 2207/30256* (2013.01); *G06V 10/454* (2022.01)

(56) References Cited

U.S. PATENT DOCUMENTS

| | | | |
|---|---|---|---|
| 2015/0235090 | A1 | 8/2015 | Kumano et al. |
| 2015/0248771 | A1 | 9/2015 | Kim |
| 2016/0026877 | A1* | 1/2016 | Zhang .................. H04N 7/183 348/148 |
| 2016/0026878 | A1* | 1/2016 | Zhang .................. G06K 9/4609 348/148 |
| 2017/0267177 | A1* | 9/2017 | Nariyambut Murali .................. G06K 9/4628 |
| 2019/0114510 | A1* | 4/2019 | Bremer ................ G06K 9/6271 |
| 2019/0138024 | A1* | 5/2019 | Liang .................. G06K 9/6273 |

FOREIGN PATENT DOCUMENTS

| | | |
|---|---|---|
| CN | 104036253 | 9/2014 |
| CN | 104657735 | 5/2015 |
| CN | 105718916 | 6/2016 |
| CN | 106887004 | 6/2017 |
| CN | 106971155 | 7/2017 |
| JP | 2011118509 | 6/2011 |
| JP | 2015153163 | 8/2015 |

\* cited by examiner

LANE LINE RECOGNITION METHOD, LANE LINE RECOGNITION DEVICE AND NON-VOLATILE STORAGE MEDIUM

CROSS-REFERENCE TO RELATED PATENT APPLICATIONS

This application is a U.S. National Stage Application under 35 U.S.C. § 371 of International Patent Application No. PCT/CN2019/071651, filed Jan. 14, 2019, which is incorporated by reference in its entirety.

TECHNICAL FIELD

Embodiments of the present disclosure relate to a lane line recognition method, a lane line recognition device corresponding to the method, and a computer executable non-volatile storage medium.

BACKGROUND

With the popularization of vehicles in cities, driving safety has been paid more and more attention, and some driving safety technologies have gradually developed, such as back-up assistance devices, distance measurement technology, and lane line tracking technology.

Existing lane line detection technology performs lane line detection on collected entire lane image frames, does not distinguish left and right lane lines, and cannot perform detection based on the characteristics of left and right lane lines. Therefore, the detection accuracy is low. Moreover, the recognition and detection of the entire image frame will lead to a large amount of calculation, a slow calculation speed and a low detection efficiency.

In addition, some existing lane line detection technologies transform the original image into a bird's-eye view so that the lane lines in the image are parallel and vertical. Although it is convenient to extract lane lines, this method also requires a large amount of calculation. Moreover, the interference of pedestrians and vehicles in the front can easily cause distortion of pedestrians and vehicles in the bird's eye view, which may cause unknown false detection of lane lines.

SUMMARY

According to at least one embodiment of the present disclosure, a lane line recognition method is provided. The method comprises: obtaining a first image, wherein the first image is a road image; dividing the first image from a middle of the first image to determine a first sub-image at a left part of the first image and a second sub-image at a right part of the first image; and performing respectively a recognition operation on the first sub-image and the second sub-image to determine a first lane line in the first sub-image and a second lane line in the second sub-image.

For example, the performing respectively the recognition operation on the first sub-image and the second sub-image to determine the first lane line in the first sub-image and the second lane line in the second sub-image comprises: performing feature extraction on the first sub-image based on a first convolution filter kernel to obtain a feature of the first lane line; and performing feature extraction on the second sub-image based on a second convolution filter kernel to obtain a feature of the second lane line, wherein the first convolution filter kernel and the second convolution filter kernel are symmetrical to each other.

For example, the performing the feature extraction on the first sub-image based on the first convolution filter kernel to obtain the feature of the first lane line comprises: filtering out a left edge of the first lane line in the first sub-image based on the first convolution filter kernel, and the performing the feature extraction on the second sub-image based on the second convolution filter kernel to obtain the feature of the second lane line comprises: filtering out a right edge of the second lane line in the second sub-image based on the second convolution filter kernel.

For example, the performing respectively the recognition operation on the first sub-image and the second sub-image to determine the first lane line in the first sub-image and the second lane line in the second sub-image further comprises: stitching an image obtained by performing the feature extraction on the first sub-image and an image obtained by performing the feature extraction on the second sub-image to obtain a feature stitched image; determining a dividing threshold between a foreground and a background of the feature stitched image; and binarizing the stitched image based on the dividing threshold.

For example, the performing respectively the recognition operation on the first sub-image and the second sub-image to determine the first lane line in the first sub-image and the second lane line in the second sub-image further comprises: dividing the binarized stitched image into a first binary image and a second binary image; transforming the first binary image into a first Hough space; transforming the second binary image into a second Hough space; and determining the first lane line and the second lane line based on a peak point of voting values of polar coordinate points in the first Hough space and the second Hough space, the voting value representing a number of curves passing through the polar coordinate point in the Hough space, wherein the transforming the first binary image into the first Hough space or the transforming the second binary image into the second Hough space comprises: determining, in the Hough space, a curve corresponding to a pixel point whose pixel value is not 0; and constructing the Hough space based on the curve.

For example, the determining the first lane line and the second lane line based on the peak point of the voting values of polar coordinate points in the first Hough space and the second Hough space comprises: determining a first peak point in the first Hough space and using a straight line determined based on the first peak point as the first lane line; and determining a second peak point in the second Hough space and using a straight line determined based on the second peak point as the second lane line.

For example, the determining the first peak point in the first Hough space comprises: determining a point which is passed through most times by the curve in the first Hough space; and using the point as the first peak point, and the determining the second peak point in the second Hough space comprises: determining a point which is passed through most times by the curve in the second Hough space; and using the point as the second peak point.

For example, the determining of the first peak point and the determining of the second peak point are performed simultaneously.

For example, the method further comprises: performing lane line tracking based on the determined first lane line and the determined second lane line.

For example, the obtaining the first image comprises: obtaining a plurality of frames of the first images, the performing the lane line tracking based on the determined first lane line and the determined second lane line comprises:

establishing a polar coordinate parameter coordinate library, the polar coordinate parameter coordinate library storing a polar coordinate value corresponding to the first peak point and/or the second peak point obtained in each of the plurality of frames of the first images; determining distances between a second straight line corresponding to a peak point of each current frame and first straight lines corresponding to peak points of a plurality of previously obtained image frames, based on an obtaining order of the plurality of frames of the first images; and determining, based on the distances, whether a straight line corresponding to each peak point is an output lane line.

For example, the determining the distances between the second straight line corresponding to the peak point of each current frame and the first straight lines corresponding to peak points of a plurality of previously obtained preset image frames comprises: determining the distance between the first straight line and the second straight line by a following formula: $d=(\rho2-\rho1)*k1+(\theta2-\theta1)*c1$, where d represents the distance, $(\rho2, \theta2)$ is a polar coordinate value of the second straight line, $(\mu1, \theta1)$ is a polar coordinate value of the first straight line, k1 is a preset constant, $c_1=\frac{1}{4}*\sqrt{f^2+n^2}$, wherein f and n represent length and width of the first image, respectively.

For example, in a case where a lane line in the first image is located in a middle area of the first image, the determining the distances between the second straight line corresponding to the peak point of the current frame and the first straight lines corresponding to the peak points of the plurality of image frames obtained previously comprises: determining the distance between the first straight line and the second straight line by a following formula: $d=(\rho2-\rho1)*k2+(\theta2-\theta1)*c2$, where $k2=0.8*k1$, and a value of c2 ranges from $\frac{1}{2}*c_1$ to $\frac{2}{3}*c_1$.

For example, the determining, based on the distances, whether the straight line in a rectangular coordinate system corresponding to each peak point is the output lane line comprises: determining that the first straight line and the second straight line are a same straight line, in a case where the distance is less than a preset distance, wherein the preset distance threshold is related to a size of the image.

For example, the determining, based on the distances, whether the straight line corresponding to each peak point is the output lane line further comprises: win a case where the first straight line and the second straight line are the same straight line, replacing a polar coordinate value corresponding to the first straight line with a polar coordinate value corresponding to the second straight line, and increasing a count value of the polar coordinate value corresponding to the first straight line by 1 in the polar coordinate parameter coordinate library; and determining whether a voting value of each polar coordinate value is greater than a preset count threshold, and determining that a straight line corresponding to a polar coordinate value is the output lane line in a case where a voting value of the polar coordinate value is greater than the preset count threshold.

For example, the determining, based on the distances, whether the straight line corresponding to the peak point is the output lane line further comprises:

reducing a count value of the polar coordinate value corresponding to the first straight line by 1, in a case where the first straight line and the second straight line are not the same straight line; and determining whether the count value of each polar coordinate value is less than or equal to a preset minimum count threshold, and deleting a polar coordinate value from the polar coordinate parameter coordinate library in a case where a voting value of the polar coordinate value is less than or equal to the preset minimum count threshold.

For example, the determining, based on the distances, whether the straight line corresponding to the peak point is the output lane line further comprises: determining whether there is an empty position corresponding to the deleted polar coordinate value in the polar coordinate parameter coordinate library, in a case where the first straight line and the second straight line are not the same straight line; and storing the polar coordinate value corresponding to the first straight line at the empty position, in a case where it is determined that there is the empty position corresponding to the deleted polar coordinate value.

For example, the performing lane line tracking based on the determined first lane line and the determined second lane line comprises: determining an actual distance between a vehicle and an actual lane line based on the output lane line; determining, based on the actual distance, whether the distance between the vehicle and the actual lane line is less than a preset safety distance threshold; and outputting an alarm prompt message, in a case where the distance between the vehicle and the actual lane line is less than the preset safety distance threshold.

For example, the determining the actual distance between the vehicle and the actual lane line based on the output lane line comprises: determining a parameter of a camera which captures the first image; adjusting, based on the parameter of the camera, a transformation matrix for a transformation between a coordinate system of the first image and a earth coordinate system; and determining the actual distance between the vehicle and the actual lane line based on the adjusted transformation matrix.

According to at least one embodiment of the present disclosure, a lane line recognition device is provided. The device comprises: an obtaining unit, configured to obtain a first image, wherein the first image is a road image; a dividing unit, configured to divide the first image from a middle of the first image to determine a first sub-image at a left part of the first image and a second sub-image at a right part of the first image; and a recognition unit, configured to perform respectively a recognition operation on the first sub-image and the second sub-image to determine a first lane line in the first sub-image and a second lane line in the second sub-image.

For example, the recognition unit performs feature extraction on the first sub-image based on a first convolution filter kernel to obtain a feature of the first lane line, and performs feature extraction on the second sub-image based on a second convolution filter kernel to obtain a feature of the second lane line; wherein the first convolution filter kernel and the second convolution filter kernel are symmetrical to each other; the recognition unit filters out a left edge of the first lane line in the first sub-image based on the first convolution filter kernel, and filters out a right edge of the second lane line in the second sub-image based on the second convolution filter kernel.

For example, the device further comprises: a tracking device configured to perform lane line tracking based on the determined first lane line and the determined second lane line.

For example, the obtaining unit obtains a plurality of frames of the first images; and the tracking unit further establishes a polar coordinate parameter coordinate library storing polar coordinate values corresponding to a first peak point and a second peak point obtained in the first image of each of the plurality of frames of the first images; determines, based on an order of obtaining the plurality of frames of the first images, distances between a second straight line corresponding to a peak point of each current frame and first straight line corresponding to peak points of a plurality of image frames previously obtained; and determines, based on the distances, whether a straight line corresponding to each peak point is the first lane line or the second lane line.

According to an example of the present disclosure, a lane line recognition device is provided. The device comprises a processor and a memory storing instructions which, when executed by the processor, cause the processor to perform the method of the foregoing embodiments.

According to an example of the present disclosure, a computer-readable non-volatile storage medium is provided. The computer-readable non-volatile storage medium storing computer program instructions which, when executed by a processor, cause the processor to perform the method of the foregoing embodiments.

The lane line recognition method and device of some embodiments of the present disclosure track the left lane line and the right lane line separately according to the characteristics of the left and right lane lines, thereby improving the accuracy of lane line detection. At the same time, due to the simultaneous detection of the left and right lane lines, the detection speed is greatly increased, and the requirements for the hardware platform environment are not high, thereby reducing the costs of the product.

BRIEF DESCRIPTION OF THE DRAWINGS

In order to clearly illustrate the technical solution of the embodiments of the present disclosure, the drawings used in the description of the embodiments will be briefly described in the following. The drawings in the following description are only exemplary embodiments of the present disclosure.

DETAILED DESCRIPTION

Hereinafter, optional embodiments of the present invention will be described in detail with reference to the accompanying drawings. It should be noted that steps and elements that are substantially the same are represented by the same reference numerals in this specification and the drawings, and repeated explanations of these steps and elements will be omitted.

Figure 2:
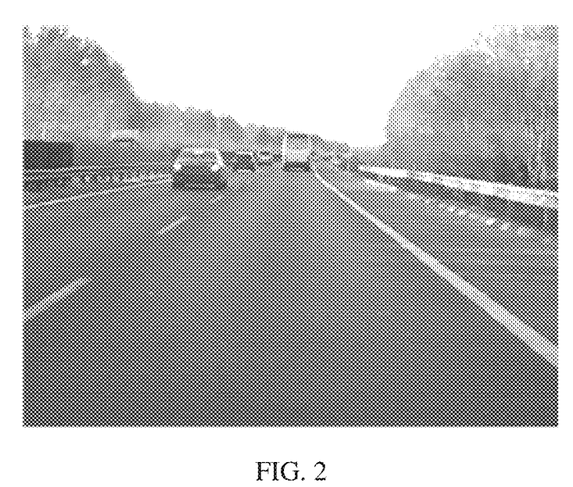
FIG. 2 is a schematic diagram illustrating a first image according to some embodiments of the present disclosure.

In some embodiments of the present disclosure, the lane line recognition method and the lane line recognition device may be implemented in software, hardware, or firmware, such as computer programs, programmable logic circuits, chips or chip sets, microcontrollers, and so on. The lane line recognition device products can be mounted on vehicles requiring lane line recognition or tracking, for example, installed outside or inside the vehicle. The lane line recognition device products can include cameras for shooting lane lines on both sides in front of the vehicle, and a display may be provided inside the vehicle to display the lane lines shot by the camera or the lane lines recognized after tracking for users to view. Certainly, the display may not be provided inside the vehicle. The lane line recognition device in some embodiments of the present disclosure calculates the distance between the vehicle and the lane line based on the track line which is tracking recognized, and when the distance between the vehicle and the lane line is less than the safe distance, an alarm or voice prompts the user to pay attention. FIG. 2 is a schematic diagram illustrating a first image in which lane lines are included according to some embodiments of the present disclosure. Referring to FIG. 2, the lane line may be a continuous straight line or a discontinuous straight line, and may also be a curved line.

Figure 1A:
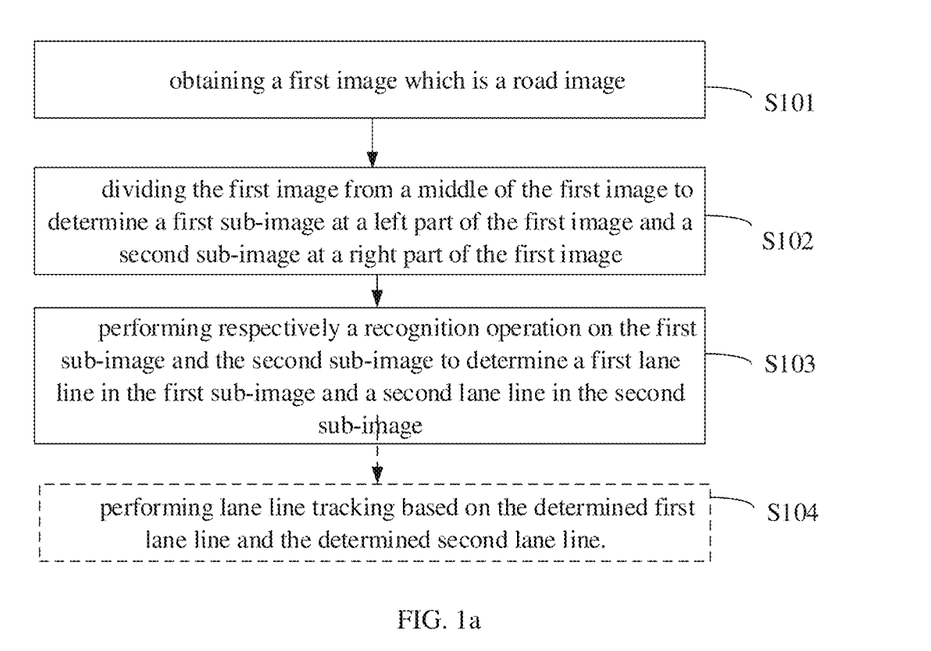
FIG. 1a is a flow chart illustrating a lane line recognition method according to some embodiments of the present disclosure.

FIG. 1a is a flow chart illustrating a lane line recognition method according to some embodiments of the present disclosure. Hereinafter, the lane line recognition method according to some embodiments of the present disclosure will be described with reference to FIG. 1a. Referring to FIG. 1a, the lane line recognition method 100 includes the following steps S101-S103. In an example, the lane line recognition method 100 may further include step S104.

In step S101, a first image, which is a road image, is obtained. For example, the first image includes lane lines. According to an example of the present disclosure, an original image captured by a camera inside or outside the vehicle may be used as the first image. The first image is an image of a ground area within a predetermined range in front of the vehicle, which includes lane lines on the left and right sides of the vehicle, for example, an image within a range of 2-15 meters in front of the vehicle. Certainly, the first image may also be an image obtained by pre-processing the captured original image, for example, an image obtained by cutting out or filtering out a main obstacle, such as a pedestrian, in the original image, or an image obtained by increasing the brightness of the original image with lower brightness, and so on. FIG. 2 is a schematic diagram illustrating a first image according to some embodiments of the present disclosure. Referring to FIG. 2, the first image includes a left lane line and a right lane line, the left lane line is a discontinuous straight line, and the right lane lines is a continuous straight lines.

According to an example of the present disclosure, a plurality of frames of the first image may be obtained. For example, while the vehicle is driving forward, images of the lane lines on both sides in front of the vehicle are continuously obtained, so that lane lines can be recognized and tracked in real time. In an example, the frequency of obtaining the plurality of frames of the first image may be determined according to the speed at which the vehicle is driving. For example, the frequency of obtaining the first image is high when the vehicle speed is fast, and the frequency of obtaining the first image is low when the vehicle speed is slow. In this way, unnecessary calculation can be reduced, and the frequency of tracking lane lines can be guaranteed to meet the speed requirements of moving vehicles.

In step S102, the first image is divided from the middle to determine a first sub-image located on the left part of the first image and a second sub-image located on the right part of the first image. For example, the first sub-image includes a first lane line, and the second sub-image includes a second lane line. According to an example of the present disclosure, after the first image is obtained in step S101, the first image may be divided from the middle into a left image and a right image, with the left image as the first sub-image and the right image as the second sub-image. The left image includes the left lane line in the first image, that is, the first lane line; the right image includes the right lane line in the first image, that is, the second lane line.

Figure 1B:
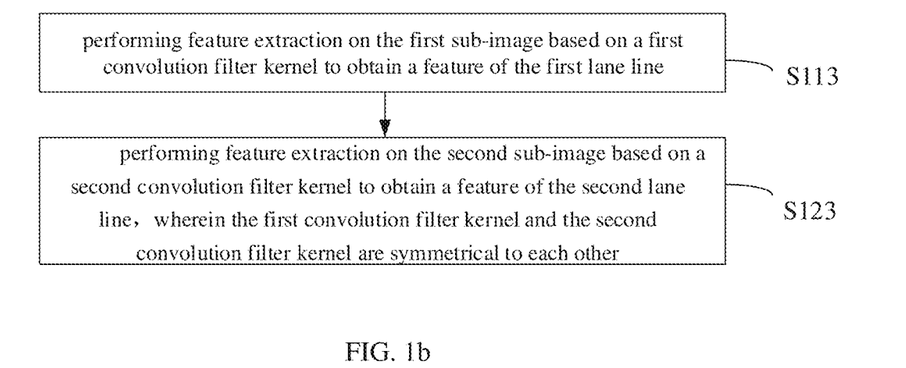
FIG. 1b is a flow chart illustrating the method of the performing respectively the recognition operation on the first sub-image and the second sub-image to determine the first lane line in the first sub-image and the second lane line in the second sub-image according to some embodiments of the present disclosure.

In step S103, recognition is performed on the first sub-image and the second sub-image to determine the first lane line in the first sub-image and the second lane line in the second sub-image. FIG. 1b is a flow chart illustrating the method of the performing respectively the recognition operation on the first sub-image and the second sub-image to determine the first lane line in the first sub-image and the second lane line in the second sub-image according to some embodiments of the present disclosure. Referring to FIG. 1b, the method of the performing respectively the recognition operation on the first sub-image and the second sub-image to determine the first lane line in the first sub-image and the second lane line in the second sub-image includes the following steps S113-S123. In step S113, performing feature extraction on the first sub-image based on a first convolution filter kernel to obtain a feature of the first lane line. In step S123, performing feature extraction on the second sub-image based on a second convolution filter kernel to obtain a feature of the second lane line, wherein the first convolution filter kernel and the second convolution filter kernel are symmetrical to each other. According to an example of the present disclosure, feature extraction may be performed on the first sub-image (i.e., the left image) and the second sub-image (that is, the right image) respectively to obtain image feature information. For example, feature extraction is performed on the first sub-image to obtain a first extracted feature, for example, a first extracted feature image. Feature extraction is performed on the second sub-image to obtain a second extracted feature, for example, a second extracted feature image.

According to an example of the present disclosure, when performing feature extraction on the first sub-image and the second sub-image, it may be implemented by using a convolution filter kernel. For example, based on a first convolution filter kernel, feature extraction is performed on the first sub-image to obtain the features of the first lane line. Based on a second convolution filter kernel, feature extraction is performed on the second sub-image to obtain the features of the second lane line. When the convolution filter kernel is used for feature extraction, each pixel in the extracted feature image is a weighted average of pixels in a small area in the first sub-image or the second sub-image, where the weight is defined by the convolution filter kernel. In an example, because the left lane line in the first sub-image and the right lane line in the second sub-image are different, the first convolution filter kernel and the second convolution filter kernel used are also different.

Generally, the left and right lane lines are symmetrical with respect to each other, and the left and right lane lines have a certain width, such as 5-30 cm, including the left and right edges. The distances from the right edge of the left lane line and the left edge of the right lane line to the vehicle are distances of the vehicle from the lane line. In order to reduce the amount of calculation and prevent edge misjudgment, the first convolution filter kernel and the second convolution filter kernel which are symmetrical with respect to each other may be adopted to filter the left edge of the left lane line and the right edge of the right lane line. In this way, after convolution is performed on the first sub-image by the first convolution filter kernel, the weighted average pixel value of the left edge of the left lane line is less than or equal to 0. During feature extraction, all pixels less than or equal to 0 will be set to 0. In this way, the left edge of the left lane line is effectively filtered out, so that the image features of the right edge of the left lane line in the first sub-image are extracted. Similarly, after convolution is performed on the second sub-image by using the second convolution filter kernel, the weighted average pixel value of the right edge of the right lane line is also less than or equal to 0. During feature extraction, all pixels less than or equal to 0 will also be set to 0. In this way, the right edge of the right lane line is also filtered out, so that the left edge of the right lane line in the second sub-image is extracted.

The first convolution filter kernel and the second convolution filter kernel which are symmetrical with respect to each other are, for example, the first convolution filter kernel HOL: [2, 2, 3, 0, −3, −2, −2] applied to the left image and the second convolution filter kernel LOH: [−2, −2, −3, 0, 3, 2, 2] applied to the right image.

By performing convolution on the first and second sub-images for feature extraction, unwanted image content can be filtered out, and useful edge information in the first and second sub-images can be retained as features extracted from the image.

Because in the captured lane line images, there are often obstacles such as railings or fences on one side of the lane line, and no obstacles on the other side. The existence of these obstacles may block a lane line on one side, which may cause interference to the recognition of the lane line. In order to accurately transform the first extracted feature image and the second extracted feature image into a binary image and determine the threshold of the binary image, according to an example of the present disclosure, the first extracted feature image and the second extracted feature image may be stitched, and the threshold of the binary image may be determined according to the stitched image.

For example, after the features of the first lane line and the second lane line are extracted, the first extracted features and second extracted features may be stitched to obtain a feature stitched image. The feature stitched image is obtained, for example, by superimposing images obtained by performing feature extraction on the first sub-image and the second sub-image. Because the area of the stitched image is larger and the lane lines on both sides are included, the impact of obstacles on one side will be greatly reduced. In this way, the threshold of the binary image determined based on the stitched image is more accurate, and the interference of obstacles in the image is effectively avoided.

According to an example of the present disclosure, after the feature stitched image is obtained, a binary image of the feature stitched image may be determined. In the process of determining the binary image of the feature stitched image, the foreground and background of the feature stitched image may be determined first. For example, the foreground and background dividing thresholds are set, and then the pixel values of the pixels included in the foreground image are set to 1 and the pixel values of the pixels included in the background image are set to 0 based on the dividing thresholds, thereby binarizing the stitched image.

In an example, the Otsu threshold algorithm can be adopted to determine the dividing threshold. The Otsu threshold algorithm is an adaptive threshold determination method that calculates the maximum value of the variance between the foreground and background images to calculate the optimal threshold.

Figure 3A:
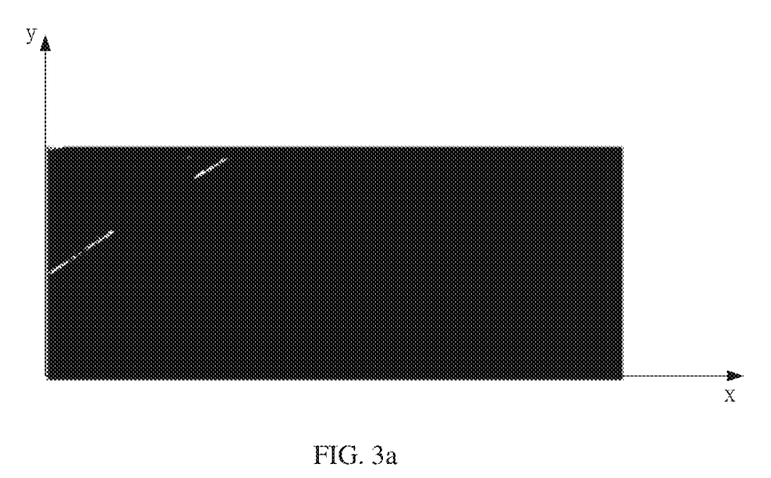
FIG. 3a is a schematic diagram illustrating a first binary image.
Figure 3B:
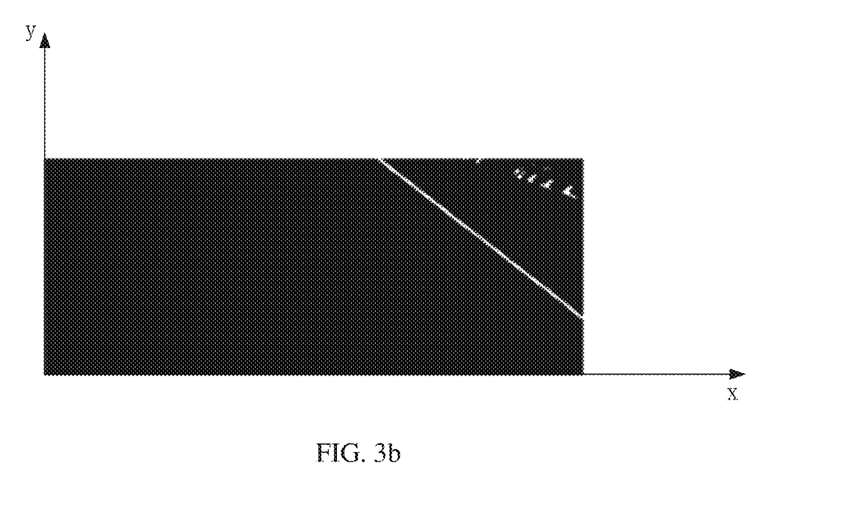
FIG. 3b is a schematic diagram illustrating a second binary image.

According to an example of the present disclosure, after the stitched image is binarized, the binarized stitched image may be further divided into a first binary image and a second binary image. For example, the scales of the first binary image and the second binary image may be the same, which is convenient for the calculation of transforming the two binary images to the Hough space at the same time by using the same algorithm. The first binary image is a left divided binary image, including the extracted features of the left lane line. The second binary image is a right divided binary image, including the extracted features of the right lane line. FIG. 3a is a schematic diagram illustrating a first binary image, and FIG. 3b is a schematic diagram illustrating a second binary image. As can be seen from FIGS. 3a-3b, the straight line formed by the white pixels is the left or right lane line. In FIGS. 3a and 3b, the abscissa represents the value of x in the rectangular coordinate system, and the ordinate represents the value of y in the rectangular coordinate system.

Then, according to an example of the present disclosure, two binary images can be transformed into Hough spaces, respectively. Because the extracted right edge of the left lane line and the extracted left edge of the right lane line are often straight lines, it is necessary to determine the slope and extreme values of straight lines when using a rectangular coordinate system to represent the straight lines. If a lane line is perpendicular to the X-axis, the slope of the straight line corresponding to the lane line will be infinite. If the lane line is perpendicular to the Y-axis, the extreme value of the straight line corresponding to the lane line will be infinite. During the calculation of a computer algorithm, if a certain value is infinite, the calculation result is likely to be wrong. The standard linear Hough transform adopts a polar coordinate parameter space to avoid algorithm errors caused by slope and extreme values.

Figure 4A:
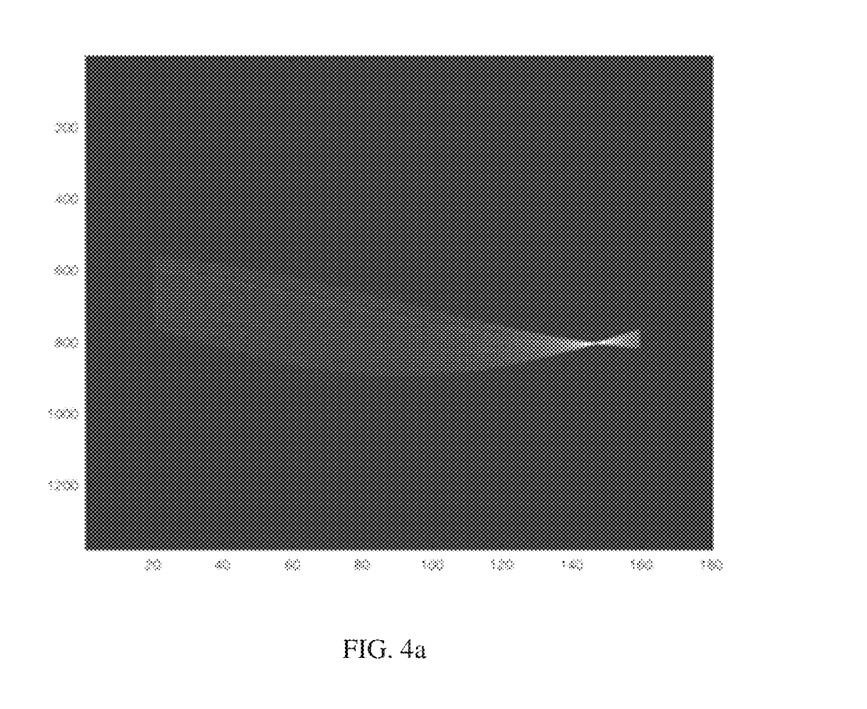
FIG. 4a is a schematic diagram illustrating a first Hough space.
Figure 4B:
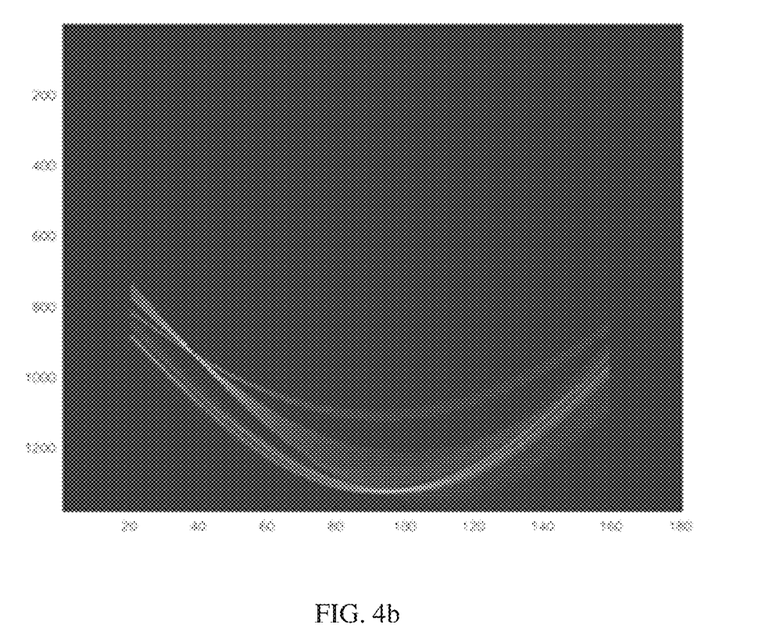
FIG. 4b is a schematic diagram illustrating a second Hough space.

In an example, the first binary image is transformed into a first Hough space and the second binary image is transformed into a second Hough space. Thereafter, according to an example of the present disclosure, the first lane line and the second lane line are determined based on the values in the first Hough space and the second Hough space. FIG. 4a is a schematic diagram illustrating the first Hough space, and FIG. 4b is a schematic diagram illustrating the second Hough space. In FIGS. 4a and 4b, the abscissa represents the value of $\theta$ in the polar coordinate system, and the ordinate represents the value of p in the polar coordinate system.

In an example, when transforming the first binary image into the first Hough space and the second binary image into the second Hough space, each pixel point in the first binary image or the second binary image can be traversed first to determine the pixel point with a value of 1 in the binary image. Because a point in the rectangular coordinate system corresponds to a curve in the Hough space, a plurality of pixel points in the first binary image in FIG. 3a correspond to a plurality of curves in the first Hough space in FIG. 4a. Similarly, a plurality of pixel points in the second binary image in FIG. 3b correspond to a plurality of curves in the second Hough space in FIG. 4b. The curve in the polar coordinate space corresponding to each pixel point with a pixel value of 1 in the first binary image is determined, thereby transforming the first binary image into the first Hough space. Similarly, the curve in the polar coordinate space corresponding to each pixel point with a pixel value of 1 in the second binary image is determined, thereby transforming the second binary image into the second Hough space.

The following takes only the first binary image as an example to introduce how to transform a binary image into a Hough space, the method of transforming the second binary image into the second Hough space is the same as all embodiments and all examples of transforming the first binary image into the first Hough space. Those skilled in the art can also understand the method of transforming the second binary image to the second Hough space according to this example.

According to an example of the present disclosure, the size of the first Hough space H ($\rho$, $\theta$) is (1400, 180), that is, the range of $\rho$ is 0-1400, and the range of $\theta$ is 0-180 degrees. When determining the curve in the polar coordinate space corresponding to the pixel point with the pixel value of 1 in the first binary image, first determine the coordinate of the pixel point with the pixel value of 1 in the rectangular coordinate system, that is, values of (x, y), and then bring the coordinate value into the following rectangular and polar coordinate transformation formula:

$\rho = x^* \cos(\theta) + y^* \sin(\theta)$

In the above formula, the $\rho$ and $\theta$ values of a point corresponding to (x, y) are not unique, so for a point corresponding to each (x, y), the value of $\theta$ is set to be all or part of the values from 0 degrees to 180 degrees respectively, and then the value of $\rho$ is calculated for each value of $\theta$ by using the above formula. For example, the value of $\rho$ when $\theta=0$ degree is calculated, the value of $\rho$ when $\theta=1$ degree is calculated, ..., the value of $\rho$ when $\theta=180$ degrees is calculated. The polar coordinate point for each polar value formed by each $\theta$ value and the corresponding $\rho$ value in the Hough space is determined, and then all the polar coordinate points are connected to obtain a curve in the polar coordinate space corresponding to a pixel point of (x, y) in the binary image.

While constructing the curves in the first Hough space and the second Hough space, a first Hoff space matrix, a second Hough space matrix, a first Hough space polar coordinate parameter space pool, and a second Hough space polar coordinate parameter space pool, can be obtained at the same time. The first Hough space matrix and the first Hough space polar coordinate parameter space pool are created based on all the curves in the first Hough space. The second Hough space matrix and the second Hough space polar coordinate parameter space pool are created based on all the curves in the second Hough space. The following description only takes the construction of the first Hough space matrix and the construction of the first Hough space polar coordinate parameter space pool as an example. The construction of the second Hough space matrix and the second Hough space polar coordinate parameter space pool are the same as all the embodiments and all examples in the construction of the first Hough space matrix and the first Hough space polar coordinate parameter space pool.

In an example, the first Hough space matrix of size (1400,180) is represented as $$H = \begin{bmatrix} \rho_0\theta_0 & \cdots & \rho_0\theta_{180} \\ \vdots & \ddots & \vdots \\ \rho_{1400}\theta_0 & \cdots & \rho_{1400}\theta_{180} \end{bmatrix}$$

In the first Hough space matrix H described above, $\rho_0\theta_0$ represents the polar coordinate point when $\rho=0$ and $\theta=0$, $\rho_0\theta_{180}$ represents the polar coordinate point when $\rho=0$ and $\theta=180$, $\rho_{1400}\theta_0$ represents the polar coordinate point when $\rho=1400$ and $\theta=0$, $\rho_{1400}\theta_{180}$ represents the polar coordinate point when $\rho=1400$ and $\theta=180$, and so on.

After the first Hough space matrix is set, the first Hough space polar coordinate parameter space pool can be determined based on the matrix. The first Hough space polar coordinate parameter space pool includes the first Hough space matrix and a voting value of each point in the matrix. That is, each polar coordinate point in the Hough space matrix described above may correspond to a voting value, and the voting value may represent the number of all curves passing through the polar coordinate point in the first Hough space of FIG. 4a. When there is one curve passing through a point of the matrix, the voting value of that point is 1; when there is no curve passing through a point on the matrix, the voting value of that point is 0; and when there are n curves passing through a point on the matrix, the voting value of that point is n, where n is a positive integer greater than or equal to 1.

Referring to FIG. 4a, the first Hough space includes a plurality of curves, and some points in the matrix are passed through by multiple curves. As described above, when there are multiple curves passing through the same point, the voting value of that point is the number of all curves passing through the point. According to an example of the present disclosure, the voting value of each polar coordinate point in the first Hough space can be determined according to the number of curves passing through a certain point.

After the polar coordinate values of all the points of all the curves in the first Hough space of FIG. 4a are determined, the voting values of each polar coordinate point in the first Hough space matrix can be obtained. By comparing the voting values of all points in the first Hough space matrix, it can be determined which point in the first Hough space has been passed through by the largest number of curves. The point with the highest voting value, that is, the point that has been passed through by the largest number of curves, is set as the peak point.

A first peak point in the first Hough space and a second peak point in the second Hough space are determined according to the above methods, respectively. Because a polar coordinate point in the Hough space corresponds to a straight line in the rectangular coordinate system, two straight lines in the rectangular coordinate system are determined after the first peak point and the second peak point are determined. The line corresponding to the first peak point is determined as the first lane line, that is, the left lane line; and the line corresponding to the second peak point is determined as the second lane line, that is, the right lane line. In this way, the left and right lane lines are recognized from the captured first image.

In an example, the sizes of the first binary image and the second binary image are the same. When the binary image of the first image is divided into the first binary image and the second binary image with the same size, the peak points in the Hough space can be detected for both binary images at the same time, that is, the determination of the first peak point and the determination of the second peak point are performed at the same time. Compared with the lane line tracking of the entire image of other methods, the calculation time is greatly reduced, and the calculation efficiency is significantly improved.

In some embodiments of the present disclosure, by dividing the obtained first image including lane lines to perform feature extraction by transforming the divided images into the binary image after stitching, and then dividing the binary image and transforming the divided binary image into the Hough space respectively to determine the peaks, the first lane line and the second lane line in the first image can be accurately recognized. Users can determine whether the moving vehicle is close to the lane line and there is danger according to the recognized lane line, which effectively reduces the occurrence of traffic accidents.

In the above embodiments, the first lane line and the second lane line are determined based on the polar coordinate system of the first Hough space and the second Hough space, but in some cases, the determined first lane line and second lane line are not valid lane line, for example, they may be obstacles similar to the lane lines, etc. Therefore, the first lane line and the second lane line determined in the above embodiment may be further tracked and recognized to determine the final valid lane line for output and early warning. The following further describes how to perform lane line tracking on the aforementioned first lane line and second lane line.

According to an example of the present disclosure, after the first lane line and the second lane line are determined, lane line tracking is also performed based on the determined first lane line and the second lane line.

For example, during the moving of the vehicle, the camera continuously captures the plurality of frames of the first image, and in step S103, for each frame of the first image, the first lane line and the second lane line in the frame of the first image are determined. After that, in optional step S104, lane line tracking is performed based on the plurality of first lane lines and the second lane lines determined in the plurality of frames of the first image. In an example, a polar coordinate parameter coordinate library of the first lane line and the second lane line can be established first for the lane line tracking. In an example, a polar coordinate parameter coordinate library can be established, which includes the polar coordinate parameter coordinate library of the first lane line and the second lane line. The first lane line and the second lane line are tracked simultaneously. In another example, two polar coordinate parameter coordinate libraries may also be set separately to store polar coordinates of the first lane line and the second lane line, respectively. The first lane line and the second lane line are tracked separately.

The following description takes the simultaneous tracking of the first lane line and the second lane line as an example. Those skilled in the art can also understand how to track the first lane line and the second lane line separately according to this example.

Assume that the polar coordinate parameter coordinate library storing the first lane line and the second lane line is D, $\rho_{11}$, $\theta_{11}$ represents the polar coordinate value corresponding to the first peak point of the first frame of the first image, $\rho_{12}$, $\theta12$ represents the polar coordinate value corresponding to the second peak point of the first frame of the first image, $\rho_{m1}$, $\theta_{m1}$ represents the polar coordinate value corresponding to the first peak point of the M-th frame of the first image, and $\rho m2$, $\theta m2$ represents the polar coordinate value corresponding to the second peak point of the M-th frame of the first image, where m is greater than or equal to 2. In an example of the present disclosure, the polar coordinate corresponding to the first peak point of the m-th frame of the first image and the polar coordinate corresponding to the second peak point of the m-th frame of the first image may or may not be stored in the polar coordinate parameter coordinate library. Whether the polar coordinate is stored in the polar coordinate parameter coordinate library will be described later.

$$D = \begin{bmatrix} \rho_{11} & \rho_{12} & \cdots & \cdots & \rho_{m1} \rho_{m2} & \cdots & \cdots \\ \theta_{11} & \theta_{12} & \cdots & \cdots & \theta_{m1} \theta_{m2} & \cdots & \cdots \end{bmatrix}$$

Numerous groups of polar coordinate values can be stored in the polar coordinate parameter coordinate library, and each group of polar coordinate values represents the coordinates of the first peak point corresponding to the left lane line or the coordinates of the second peak point of the right lane line in a frame of the first image. The size of the polar coordinate parameter coordinate library can be set. For example, the polar coordinate parameter coordinate library can store at most g groups of polar coordinate values, g represents the maximum number of polar coordinate values stored in the coordinate library, and the value of g is, for example, 10, that is, the coordinate library stores at most 10 groups of polar coordinate value data. Because the polar coordinate values in the polar coordinate parameter coordinate library will be compared and replaced with each other in the future, the number of polar coordinate values stored after replacement will be reduced, for example, generally, approximately 6 groups are maintained, and therefore 10 groups of data can meet the requirements of general lane line tracking. Certainly, g can be any value from 5 to 30.

In an example, after the polar coordinate parameter coordinate library is established, the polar coordinate value corresponding to the first peak point obtained in the first frame of the first image may be stored at $(\rho_{11}, \theta_{11})$. The polar coordinate value corresponding to the second peak point obtained in the first frame of the first image may be stored at $(\rho_{12}, \theta_{12})$. Then, the polar coordinate value corresponding to the first peak point obtained in the second frame of the first image are obtained. The relationship between the polar coordinate values corresponding to the first peak points obtained in the second frame of the first image and the polar coordinate values corresponding to the first peak point and the second peak point obtained in the first frame of the first image are determined, respectively, and then it is determined whether to store the polar coordinate value corresponding to the first peak point obtained in the second frame of the first image.

In addition, the polar coordinate value corresponding to the second peak point obtained in the second frame of the first image is the same case. The relationship between the polar coordinate value corresponding to the second peak point obtained in the second frame of the first image and the polar coordinate values corresponding to the first peak point and the second peak point obtained in the first frame of the first image are determined, respectively, and then it is determined whether to store the polar coordinate value corresponding to the second peak point obtained in the second frame of the first image.

After the polar coordinate parameter coordinate library is established, because a point in the polar coordinate system corresponds to a straight line in the rectangular coordinate system, that is, the first peak point corresponds to the left lane line obtained in a frame of image. The second peak point corresponds to the right lane line obtained in a frame of image. Therefore, it can be assumed that in the polar coordinate parameter coordinate library, the polar coordinate value corresponding to the first peak point or the second peak point corresponding to the current frame is a second straight line, that is, the number of the second straight lines is two. The polar coordinate value corresponding to the first peak point or the second peak point corresponding to the previous frame or frames of the current frame corresponds to the first straight line, that is, the number of the first straight lines is also two. The distance between the second straight line in each current frame in the coordinate library and the first straight line in all previous image frames stored in the polar coordinate parameter coordinate library can be determined separately. For the first straight line obtained in the previous image frame that is not stored in the polar coordinate parameter coordinate library, it is not necessary to compare and calculate the distance therewith.

For example, after the polar coordinate value of the first peak point obtained in the second frame of image is obtained, the polar coordinate value of the first peak point obtained in the second frame of image may be stored in a temporary memory, and then compared with the polar coordinate value corresponding to the first peak point obtained in the first frame of the first image to determine the distance between the two straight lines. Then, the polar coordinate value of the first peak point obtained in the second frame of image is compared with the polar coordinate value corresponding to the second peak point obtained in the first frame of the first image to determine the distance between the two straight lines. Similarly, for example, after obtaining the polar coordinate value of the second peak point obtained in the second frame of the image, the polar coordinate value of the second peak point obtained in the second frame of the image may be stored in a temporary memory, and then compared with the polar coordinate value corresponding to the first peak point obtained in the first frame of the first image to determine the distance between the two straight lines. Then, the polar coordinate value of the second peak point obtained in the second frame of the image is compared with the polar coordinate value corresponding to the second peak point obtained in the first frame of the first image to determine the distance between the two straight lines.

For another example, after obtaining the polar coordinate value of the first peak point obtained in a third frame of image, the polar coordinate value of the first peak point obtained in the third frame of image may be stored in a temporary memory and compared with all the polar coordinate values stored in the coordinate library. After obtaining the polar coordinate value of the second peak point obtained in the third frame of image, the polar coordinate value of the second peak point obtained in the third frame of image may be stored in a temporary memory and compared with all polar coordinate values stored in the coordinate library, and so on.

In an example, if the distance between a second straight line and any one of the first straight lines is determined to meet the distance requirement, it is not necessary to determine the distance between the second straight line and other first straight lines.

Based on this distance, it is determined whether the straight line corresponding to each peak point is an "output lane line". In some embodiments of the present disclosure, the output lane line represents a true and valid lane line, which is a lane line after excluding all misdetected lane lines from the previous first lane lines, and is a lane line that is finally determined to be output and requires a distance warning.

According to an example of the present disclosure, when the distance between the second straight line corresponding to the peak point of each current frame and the first straight line corresponding to the peak points of the preset multiple image frames obtained previously is determined, the distance between the first straight line and the second straight line can be determined by the following formula:

$$d=(\rho_2-\rho_1)*k_1+(\theta_2-\theta_1)*c_1$$

where d represents the distance between the first straight line and the second straight line, $(\rho_2, \theta_2)$ is the polar coordinate value of the second straight line, $(\rho_1, \theta_1)$ is the polar coordinate value of the first straight line, and $k_1$ is a preset constant, for example, Ki is set to 1. The value of $c_1$ is related to the size of the first image. For example, $c_1=\frac{1}{4}*\sqrt{f^2+n^2}$, where f and n represent the length and width of the first image, respectively.

Because lanes may be changed when a vehicle is moving, the first lane line or the second lane line may appear in the middle area of the first image.

The position range of the middle area of the image can be preset, and when the lane line recognition is performed to determine that the position of the lane line is within the position range of the preset middle area, the first lane line or the second lane line may be determined to be located in the middle area.

When the vehicle changes lanes quickly, the lane line captured in the middle area may be a virtual shadow with a certain width or may be of a lightning logo shape with a certain width. Because the shape is wider than a straight line, if the thresholds of the parameters K and c are too high, two lines may be recognized, thereby causing lane line recognition errors. In addition, the difference between the left and right convolution filter kernels may cause tracking failure. Therefore, for the case where the lane line is located in the middle area of the first image, when calculating the distance between the first straight line and the second straight line, the threshold of the parameter k or c can be appropriately reduced, and the lane line may be recognized as one line, thereby improving the recognition rate. For example, the distance between the first and second straight lines can be determined by the following formula:

$$d=(\rho_2-\rho_1)*k_2+(\theta_2-\theta_1)*c_2$$

For example, the value of parameter $k_2$ is lower than the value of parameter $k_1$, and the value of parameter $c_2$ is lower than that of $c_1$. For example, $k_2=0.8k_1$. The value of c2 ranges from $\frac{1}{2}*c_1$ to $\frac{2}{3}*c_1$.

In an example of the present disclosure, after the distance between the second straight line and the first straight line is determined, when the distance is less than a preset distance threshold, it is determined that the first straight line and the second straight line are the same straight line. When the distance is greater than or equal to the preset distance threshold, it is determined that the first straight line and the second straight line are not the same straight line. For example, the preset distance threshold S is related to the size of the image. For example, $S=\frac{1}{16}*\sqrt{m^2+n^2}$, where m and n represent the length and width of the first image, respectively.

According to an example of the present disclosure, after the polar coordinate value corresponding to the first peak point obtained in the image frame is stored in the polar parameter coordinate library each time, the distances between the second straight line corresponding to the polar coordinate value and the first straight lines corresponding to other polar coordinate values stored in the coordinate library are determined. For example, each time a polar coordinate value obtained in a frame of image is stored in the coordinate library, the count value is set to an initial value, and the initial value is, for example, 1 or 2. When it is determined that the first straight line and the second straight line are the same straight line, in the polar coordinate parameter coordinate library, the polar coordinate value corresponding to the second straight line is used to replace the polar coordinate value corresponding to the first straight line, and the count value at the storage location in the matrix where the polar coordinate value corresponding to the first straight line is located is increased by 1. After the comparison operation, in a case where the first straight line and the second straight line are not the same straight line, the count value of the storage position of the polar coordinate value corresponding to the first straight line is reduced by 1. If the count value is reduced to 0, the data stored in the storage location of the polar coordinate value is deleted, and the polar coordinate value of the first peak point or the second peak point in other new image frames to be stored is stored at this location. After the storage operation, the count value is also reset to the initial value. The count value at the storage location represents the count value of the polar coordinate value stored in the storage location.

For example, every time after the determination of the distance between the second straight line and the first straight line ends, it can be determined whether the count value of each polar coordinate value is equal to a preset minimum count threshold, the minimum count threshold is, for example, 0. When the count value of a position of a polar coordinate value is equal to the preset minimum count threshold, the polar coordinate value with the count value of 0 is deleted from the polar coordinate parameter coordinate library. In this way, if a polar coordinate value corresponding to the first peak point or the second peak point obtained in a new image frame is added to the coordinate library again in the future, the polar coordinate value corresponding to the first peak point or the second peak point obtained in the new image frame may be stored in the storage position where the polar coordinate value deleted because the count value is reduced to 0. If there is no such empty position, the polar coordinate value corresponding to the first peak point or the second peak point obtained in the new image frame is stored in a position behind the other data in the coordinate library.

For example, the polar coordinate value corresponding to the first peak point obtained in the first frame of the first image is stored at the position $(\rho_{11}, \theta_{11})$ of the matrix D, and the initial value of the count value of the polar coordinate value is set to 1. The polar coordinate value corresponding to the second peak point obtained in the first frame of the first image is stored at the position $(\rho_{12}, \theta_{12})$ of the matrix D, and the initial value of the count value of the polar coordinate value is also set to 1. After the second frame of the first image is captured, the polar coordinate value corresponding to the first peak point is obtained from the second frame of the first image, and then the polar coordinate value $(\rho_{21}, \theta_{21})$ corresponding to the first peak point obtained in the second frame of the first image is compared with the first straight line corresponding to the polar coordinate value stored at the position $(\rho_{11}, \theta_{11})$. If the distance between the two straight lines is less than the aforementioned preset distance threshold, it indicates that the two straight lines are the same straight line, and then $(\rho_{11}, \theta_{11})$ is replaced by the polar coordinate value $(\rho_{21}, \theta_{21})$ corresponding to the first peak point obtained in the second frame of the first image, that is, $(\rho_{11}, \theta_{11})$ is deleted, and $(\rho_{21}, \theta_{21})$ is stored at the position of $(\rho_{11}, \theta_{11})$. At the same time, the count value at the storage location of $(\rho_{11}, \theta_{11})$ is increased by 1, and at this time, the voting value for the storage location of $(\rho_{11}, \theta_{11})$ is 2. In an example, the distance between the polar coordinate values $(\rho_{21}, \theta_{21})$ and other first straight lines may no longer be determined in this case.

If the distance between the two straight lines is greater than or equal to the aforementioned preset distance threshold, it indicates that the two straight lines are not the same straight line, and the count value at the position of $(\rho_{11}, \theta_{11})$ is reduced by 1. If the count value at the position of $(\rho_{11}, \theta_{11})$ at this time is 0, $(\rho_{11}, \theta_{11})$ is deleted from that position. In addition, the distance between the polar coordinate values $(\rho_{21}, \theta_{21})$ and other first straight lines is further determined.

The polar coordinate value $(\rho_{21}, \theta_{21})$ corresponding to the first peak point obtained in the second frame of the first image is compared with the polar coordinate value corresponding to the second peak point obtained in the first frame of the first image, that is, the second straight line corresponding to the polar coordinate value $(\rho_{21}, \theta_{21})$ is compared with the first straight line corresponding to $(\rho_{12}, \theta_{12})$. If the distance between the two straight lines is less than the aforementioned preset distance threshold, it indicates that the two straight lines are the same straight line, and then $(\rho_{12}, \theta_{12})$ is replaced by the polar coordinate value $(\rho_{21}, \theta_{21})$ corresponding to the first peak point obtained in the second frame of the first image, that is, $(\rho_{12}, \theta_{12})$ is deleted, and $(\rho_{21}, \theta_{21})$ will be stored at the position of $(\rho_{12}, \theta_{12})$. At the same time, the count value at the storage location of $(\rho_{12}, \theta_{12})$ is increased by 1, and at this time, the voting value for the storage location of $(\rho_{12}, \theta_{12})$ is 2. At this time, the distances between the polar coordinate values $(\rho_{21}, \theta_{21})$ and other first straight lines may no longer be determined.

If the distance between the second straight line corresponding to the polar coordinate value $(\rho_{21}, \theta_{21})$ corresponding to the first peak point obtained in the second frame of the first image and the first straight line corresponding to the polar coordinate value $(\rho_{12}, \theta_{12})$ corresponding to the second peak point obtained in the first frame of the first image is also greater than or equal to the preset distance threshold, it indicates that the two straight lines are not the same straight line, and the count value at the position of $(\rho_{12}, \theta_{12})$ is reduced by 1. If the count value at the position of $(\rho_{12}, \theta_{12})$ at this time is 0, $(\rho_{12}, \theta_{12})$ is deleted from that position. In addition, the polar coordinate value corresponding to the first peak point obtained in the second frame of the first image is stored at the position of $(\rho_{21}, \theta_{21})$ of the matrix D, and the initial value of the count value at the position is set to 1.

Thereafter, the polar coordinate value $(\rho_{22}, \theta_{22})$ corresponding to the second peak point obtained in the second frame of the first image is obtained, and $(\rho_{22}, \theta_{22})$ is compared with straight lines corresponding to all the polar coordinate values stored in the current library to determine whether they are the same straight line. If they are not the same straight line as compared with straight lines corresponding to all the polar coordinate values stored in the current library, it is determined whether there are any empty positions in the current coordinate library that have been deleted because the count value becomes 0. If yes, $(\rho_{22}, \theta_{22})$ is stored at the empty position. For example, if the count value of the position of $(\rho_{11}, \theta_{11})$ becomes 0 and has been deleted, there is no data at that position, and the polar coordinate value $(\rho_{22}, \theta_{22})$ can be stored at the position of $(\rho_{11}, \theta_{11})$. Also, the initial value of the count value at the storage position of the polar coordinates is reset to 1.

For the third frame, the fourth frame, and all subsequent frames, the above comparison steps are performed, so that it is possible to determine whether the first lane line and the second lane line corresponding to the plurality of first peak points and the second peak points obtained in the continuously captured numerous frames of the first images are valid output lane lines.

In an example, it is further determined whether the count value at the storage location of each polar coordinate value is greater than a preset count threshold, and the preset count threshold is, for example, 6. When the count value at the storage location of a polar coordinate value is greater than the preset count threshold, the straight line corresponding to the polar coordinate value is determined as the output lane line. This output lane line can be used to determine and warn the distance from the vehicle. For example, the output lane line may be output to a display screen of an in-vehicle system. Alternatively, the output lane line may be used as an input parameter for determine the distance between the lane line and the vehicle.

In an example, when the count value at the storage location of the polar coordinate value reaches the highest limit value, the count value is no longer increased to save the calculation amount. The highest limit value is, for example, 20.

The above example describes how to determine a valid lane line for output. After the valid first lane line and the valid second lane line, i.e., the output lane lines, are determined, because the determination of the output lane line is made based on the first image captured by the vehicle, it is not the real lane line, the actual distance between the current vehicle and the real left lane line and the actual distance between the current vehicle and the real right lane line require being further determined based on the output lane line determined in the first image.

According to an example of the present disclosure, when the actual distance between the vehicle and the actual lane line is determined based on the output lane line, the IPM (inverse perspective mapping technology can be adopted to implement the transformation of the image coordinate system to the world coordinate system, so that the pixel point position corresponding to the output lane line finally detected in the captured first image in the foregoing embodiment can be mapped to the world coordinate system, thereby obtaining the distance between the vehicle and the real lane line on the ground.

In addition, when the actual distance between the vehicle and the actual lane line is determined based on the output lane line, because the parameters of the camera that captures the first image are different, the captured first images and the output lane lines recognized from the first images may also be different. The parameter information of the camera that captures the first image is further considered. For example, first, parameters of the camera that captures a first image may be obtained. The parameters include, for example, internal parameters or external parameters. The internal parameters include a focal length, the size of the pixel in the image in the camera's physical coordinate system, and so on. The external parameters include a yaw angle, a pitch angle, a roll angle, and so on. Then, the transformation matrix between the image coordinate system of the first image and the earth coordinate system is appropriately adjusted according to one or more parameters of the camera, and the actual distance between the vehicle and the actual lane line is determined according to the adjusted transformation matrix.

In addition, when the transformation matrix described above is determined, the position of the camera that captures the first image on the vehicle may also be considered, and the earth coordinate system may be established according to the position of the camera. For example, when the camera is located at the highest point of the center of the vehicle, the earth coordinate system can be established with the highest point of the center of the vehicle as the origin, and the transformation matrix can be adjusted according to the height of the vehicle. The actual distance between the vehicle and the actual lane line can be determined according to the adjusted transformation matrix.

After the distance between the vehicle and the actual lane line is determined, it is determined whether the distance between the vehicle and the actual lane line is greater than or equal to a preset safety distance threshold, and the preset safety distance threshold is, for example, 20 cm. If the actual distance is less than the threshold, it indicates that the vehicle is too close to the lane line and there is a potential safety hazard, so an alarm can be generated or a voice prompt message can be output or a prompt message can be displayed to remind the driver of the vehicle.

The lane line tracking method in some embodiments of the present disclosure tracks the left lane line and the right lane line separately according to the characteristics of the left and right lane lines, thereby improving the accuracy of lane line detection. At the same time, the lane line tracking speed is improved due to the simultaneous detection of the left and right lane lines.

The above describes the lane line tracking method according to some embodiments of the present disclosure. The following will further introduce a lane line tracking device according to some embodiments of the present disclosure. The lane line tracking device corresponds to the lane line tracking method in the foregoing embodiment. For the sake of conciseness of the description, it will only be briefly introduced below. For details, reference may be made to all the foregoing embodiments.

Figure 5:
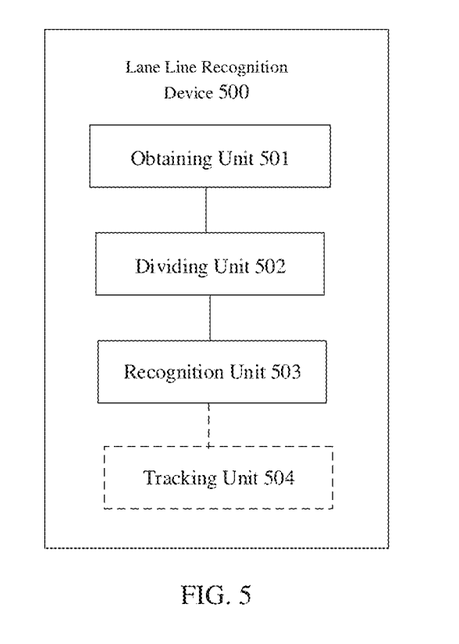
FIG. 5 is a structural diagram of a lane line recognition device according to some embodiments of the present disclosure.

FIG. 5 is a schematic structural diagram of a lane line recognition device according to some embodiments of the present disclosure. Referring to FIG. 5, the lane line recognition device 500 includes an obtaining unit 501, a dividing unit 502, and a recognition unit 503. In an example, the lane line recognition device 500 may further include a tracking unit 504. The obtaining unit 501, the dividing unit 502, the recognition unit 503, and the tracking unit 504 described above can be implemented in software, hardware, or firmware, such as a computer program, a programmable logic circuit, a chip or chipset, a single chip microcomputer, etc. The obtaining unit 501 is configured to obtain a first image, and the first image is a road image. The dividing unit 502 is configured to divide the first image from the middle to determine a first sub-image located on the left part of the first image and a second sub-image located on the right part of the first image. The recognition unit 503 is configured to recognize the first sub-image and the second sub-image, respectively, to determine a first lane line in the first sub-image and a second lane line in the second sub-image. The tracking unit 504 is configured to perform lane line tracking based on the determined first and second lane line.

Figure 6:
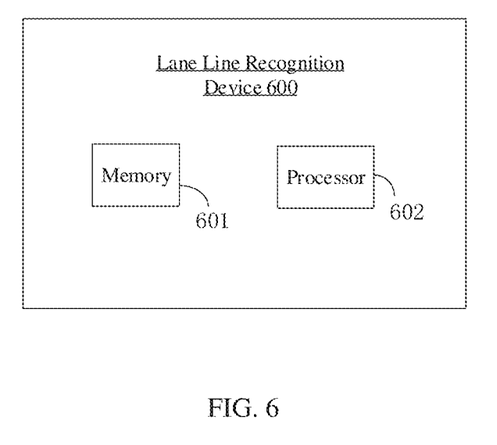
FIG. 6 is a diagram illustrating a structure of another lane line recognition device according to some embodiments of the present disclosure.

FIG. 6 shows a schematic structural diagram of another lane line recognition device according to some embodiments of the present disclosure. Referring to FIG. 6, a lane line recognition device 600 includes a memory 601 and a processor 602. The memory 601 stores computer program instructions, which when executed by the processor 602 cause the processor 602 to perform the lane line recognition method according to the above-mentioned embodiments.

According to some embodiments of the present disclosure, a computer-readable non-volatile storage medium is also provided. The non-volatile storage medium stores computer program instructions that, when executed by a processor in the computer, cause the processor to perform the lane line recognition method in the foregoing embodiment.

Those of ordinary skill in the art may realize that the units and algorithm steps of each example described in connection with the embodiments disclosed herein can be implemented by electronic hardware, computer software, or a combination thereof. Also, software modules can be provided in any form of computer storage medium. In order to clearly illustrate the interchangeability of hardware and software, the components and steps of each example have been described generally in terms of functions in the above description. Whether these functions are performed in hardware or software depends on the specific application and design constraints of the technical solution. Those skilled in the art can use different methods to implement the described functions for each specific application, and such implementation should not be considered to be beyond the scope of the present invention.

It should be understood by those skilled in the art that various modifications, combinations, sub-combinations, and replacements can be made to the present disclosure depending on design requirements and other factors, as long as these modifications, combinations, sub-combinations, and replacements are within the scope of the appended claims and the equivalents thereof.

What is claimed is:

1. A lane line recognition method, comprising:
obtaining a first image, wherein the first image is a road image;
dividing the first image from a middle of the first image to determine a first sub-image at a left part of the first image and a second sub-image at a right part of the first image; and
performing respectively a recognition operation on the first sub-image and the second sub-image to determine a first lane line in the first sub-image and a second lane line in the second sub-image,
wherein the performing respectively the recognition operation on the first sub-image and the second sub-image to determine the first lane line in the first sub-image and the second lane line in the second sub-image comprises:
performing feature extraction on the first sub-image based on a first convolution filter kernel to obtain a feature of the first lane line; and
performing feature extraction on the second sub-image based on a second convolution filter kernel to obtain a feature of the second lane line,
wherein the first convolution filter kernel and the second convolution filter kernel are symmetrical to each other.

2. The method according to claim 1, wherein
the performing the feature extraction on the first sub-image based on the first convolution filter kernel to obtain the feature of the first lane line comprises:
filtering out a left edge of the first lane line in the first sub-image based on the first convolution filter kernel, and
the performing the feature extraction on the second sub-image based on the second convolution filter kernel to obtain the feature of the second lane line comprises:
filtering out a right edge of the second lane line in the second sub-image based on the second convolution filter kernel.

3. The method according to claim 1, wherein the performing respectively the recognition operation on the first sub-image and the second sub-image to determine the first lane line in the first sub-image and the second lane line in the second sub-image further comprises:

stitching an image obtained by performing the feature extraction on the first sub-image and an image obtained by performing the feature extraction on the second sub-image to obtain a feature stitched image;

determining a dividing threshold between a foreground and a background of the feature stitched image; and binarizing the feature stitched image based on the dividing threshold.

4. The method according to claim 3, wherein the performing respectively the recognition operation on the first sub-image and the second sub-image to determine the first lane line in the first sub-image and the second lane line in the second sub-image further comprises:

dividing the binarized stitched image into a first binary image and a second binary image;

transforming the first binary image into a first Hough space;

transforming the second binary image into a second Hough space; and determining the first lane line and the second lane line based on a peak point of voting values of polar coordinate points in the first Hough space and the second Hough space, the voting value representing a number of curves passing through the polar coordinate point in the Hough space, wherein the transforming the first binary image into the first Hough space or the transforming the second binary image into the second Hough space comprises:

determining, in the Hough space, a curve corresponding to a pixel point whose pixel value is not 0; and constructing the Hough space based on the curve.

5. The method according to claim 4, wherein the determining the first lane line and the second lane line based on the peak point of the voting values of the polar coordinate points in the first Hough space and the second Hough space comprises:

determining a first peak point in the first Hough space and using a straight line determined based on the first peak point as the first lane line; and determining a second peak point in the second Hough space and using a straight line determined based on the second peak point as the second lane line, the determining the first peak point in the first Hough space comprises:

determining a point which is passed through most times by the curve in the first Hough space; and using the point as the first peak point, and the determining the second peak point in the second Hough space comprises:

determining a point which is passed through most times by the curve in the second Hough space; and using the point as the second peak point, and the determining of the first peak point and the determining of the second peak point are performed simultaneously.

6. The method according to claim 5, further comprising: performing lane line tracking based on the determined first lane line and the determined second lane line.

7. The method according to claim 6, wherein the performing lane line tracking based on the determined first lane line and the determined second lane line comprises:

determining an actual distance between a vehicle and an actual lane line based on the output lane line;

determining, based on the actual distance, whether the distance between the vehicle and the actual lane line is less than a preset safety distance threshold; and outputting an alarm prompt message, in a case where the distance between the vehicle and the actual lane line is less than the preset safety distance threshold.

8. The method according to claim 7, wherein the determining the actual distance between the vehicle and the actual lane line based on the output lane line comprises:

determining a parameter of a camera which captures the first image;

adjusting, based on the parameter of the camera, a transformation matrix for a transformation between a coordinate system of the first image and a earth coordinate system; and determining the actual distance between the vehicle and the actual lane line based on the adjusted transformation matrix.

9. A lane line recognition device, comprising:

an obtaining unit, configured to obtain a first image, wherein the first image is a road image;

a dividing unit, configured to divide the first image from a middle of the first image to determine a first sub-image at a left part of the first image and a second sub-image at a right part of the first image; and a recognition unit, configured to perform respectively a recognition operation on the first sub-image and the second sub-image to determine a first lane line in the first sub-image and a second lane line in the second sub-image, wherein the recognition unit performs feature extraction on the first sub-image based on a first convolution filter kernel to obtain a feature of the first lane line, and performs feature extraction on the second sub-image based on a second convolution filter kernel to obtain a feature of the second lane line;

the first convolution filter kernel and the second convolution filter kernel are symmetrical to each other;

the recognition unit filters out a left edge of the first lane line in the first sub-image based on the first convolution filter kernel, and filters out a right edge of the second lane line in the second sub-image based on the second convolution filter kernel.

10. A lane line recognition device, comprising:

a processor; and a memory, storing instructions which, when executed by the processor, cause the processor to perform the method according to claim 1.

11. A computer-readable non-volatile storage medium, storing computer program instructions which, when executed by a processor, cause the processor to perform the method according to claim 1.

* * * * *